United States Patent [19]
Lachat et al.

[11] Patent Number: 5,791,685
[45] Date of Patent: Aug. 11, 1998

[54] THREE-CHAMBERED SIDE IMPACT AIR BAG

[75] Inventors: Michael J. Lachat, Shelby Township; Jeffrey A. Young, Eastpointe; Pongdet P. Wipasuramonton, Rochester, all of Mich.

[73] Assignee: AlliedSignal Inc., Morristown, N.J.

[21] Appl. No.: 803,477

[22] Filed: Feb. 20, 1997

[51] Int. Cl.$^6$ .................................................. B60R 21/22
[52] U.S. Cl. .................. 280/743.1; 280/729; 280/743.2; 280/730.2
[58] Field of Search ........................ 280/728.1, 728.2, 280/729, 730.1, 730.2, 743.1, 743.2

[56] References Cited

U.S. PATENT DOCUMENTS

| | | | |
|---|---|---|---|
| 3,614,127 | 10/1971 | Glance | 280/729 |
| 5,586,782 | 12/1996 | Zimmerman et al. | 280/743.1 |
| 5,647,609 | 7/1997 | Spencer et al. | 280/730.2 |

FOREIGN PATENT DOCUMENTS

| | | | |
|---|---|---|---|
| 593172 | 4/1994 | European Pat. Off. | 280/729 |
| 227348 | 2/1993 | Japan | 280/730.2 |

Primary Examiner—Christopher P. Ellis
Attorney, Agent, or Firm—Markell Seitzman

[57] ABSTRACT

An air bag for installation within a seat of a vehicle to protect an occupant during a side impact collision, the air bag being deployed between the occupant and an adjacent side of the vehicle, including: a three-chambered cushion portion (22), separation panels (56a,b) having inflation gas flow restricting openings (58,58a) therein to control the interchange of inflation gas between the chambers, the cushion, proximate a lower portion (54) of the chambers including a neck portion (44) forming a pocket (94) to receive an inflator and an inlet (44) through which inflation gas enters into the lower chamber and an integral tether for assisting in controlling the deployment trajectory of the air bag.

14 Claims, 2 Drawing Sheets

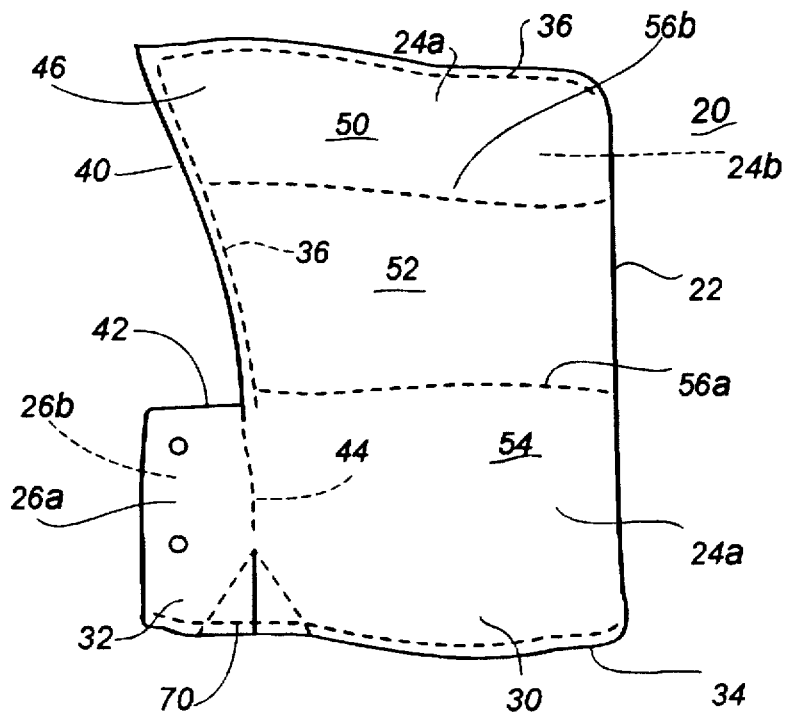
FIG. - 1
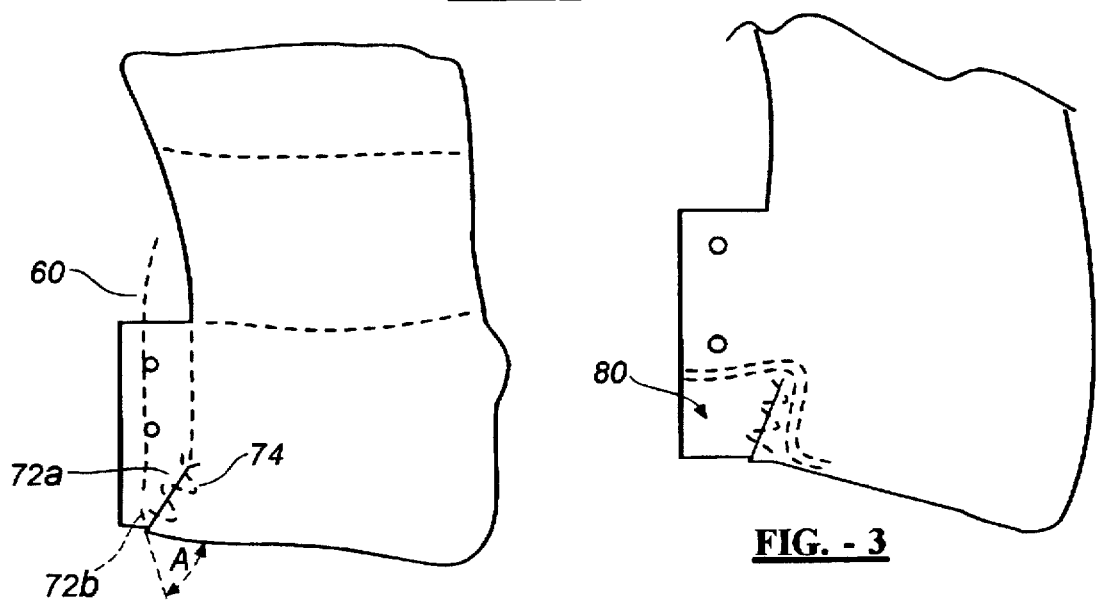
FIG. - 2
FIG. - 3
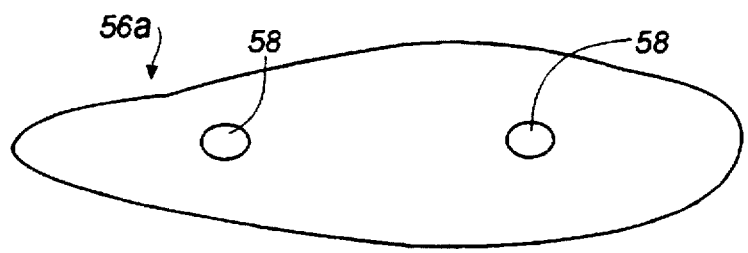
FIG. - 6

THREE-CHAMBERED SIDE IMPACT AIR BAG

BACKGROUND AND SUMMARY OF THE INVENTION

The present invention generally relates to an air bag usable to protect an occupant of the vehicle during a crash involving a side impact, and more particularly to a three-chambered air bag.

Side impact occupant protection systems are intended to protect vehicle occupants during a side impact collision. These side impact systems interpose an air bag between the occupant's torso and the interior of the vehicle. U.S. Pat. No. 3,617,073 is illustrative of a system in which the air bag is located within the door, while British Patent 2,232,936 B shows an air bag initially located within the seat. The prior art illustrates that these air bags can be formed as a single-chambered or dual-chambered cushion.

In certain vehicles, such as a van or a pickup truck, the construction of the seat positions the occupant at a relatively high seated location relative to the window sill of the vehicle and the armrests (which extend from the interior trim of the door). In this type of vehicle the area above the armrest and below the window sill is generally small, thus providing less area to act as a reaction surface for a side air bag compared to a sedan type of vehicle. For those vehicles in which the armrest projects excessively into the passenger compartment there is formed a relatively narrow corridor between the interior edge of the armrest and the side of the occupant. The obstruction presented by the occupant and the armrest's small reaction surface area cause the air bag to deploy upwardly and rearwardly, lessening the protection that might be provided for the occupant's upper torso and head during the side impact collision.

It is an object of the present invention to provide an air bag or cushion which provides improved thorax and head protection for the occupant. It is a further object of the present invention to provide a multi-chambered air bag having flow valves situated between each chamber, the air bag constructed to retain inflation gasses in the lower or thorax portion of the air bag for a relatively long period of time while still providing adequate shoulder and head protection.

Many other objects and purposes of the invention will be clear from the following detailed description of the drawings.

BRIEF DESCRIPTION OF THE DRAWINGS

In the drawings:

FIG. 1 illustrates an air bag laid flat upon a surface.

FIG. 2 illustrates the air bag subsequent to two overlapping flaps or edges being sewn together.

FIG. 3 is a partial plan view of the lower end of the air bag illustrating the formation of an integral tether.

FIG. 6 illustrates a typical separator panel used between chambers of an air bag of the present invention.

DETAILED DESCRIPTION OF THE DRAWINGS

Figure 5:
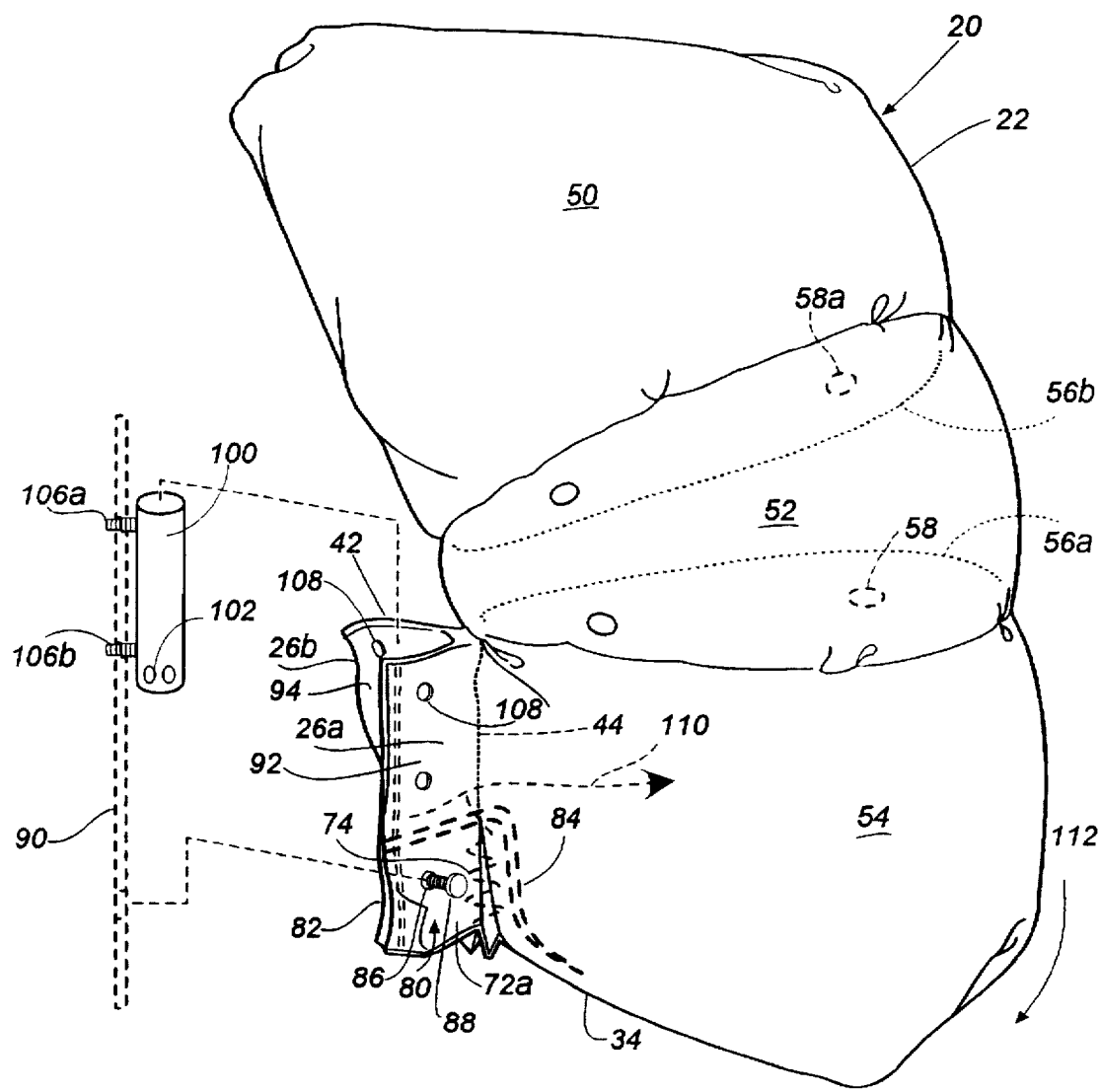
FIG. 5 illustrates an assembled, inflated air bag.

FIG. 1 illustrates an air bag generally shown as 20 laid flat upon a surface (not shown). The air bag or cushion 20 may be formed of a single piece of material that is folded along one side 22 forming two overlapping side panels 24a and 24b (which in FIG. 1 lies below panel 24a). The lower portion 25 of the air bag includes a neck portion 44 having two flaps 26a and 26b which are shown more clearly in FIG. 5. These flaps may be integral with the side panels 24a and b or attached thereto. The lower edges 30 of the overlapped panels 24a and b and the lower edge 32 of the flaps 26a and b are joined together, typically by sewing. A line of stitches is shown as numeral 34. The tops 27 of panels 24a and b are similarly joined by one or more rows of stitches 36. The stitches 36 extend downwardly along side 40 and terminate generally proximate the top 42 of the flaps 26a,b. As can be appreciated, the portion of the unsewn airbag proximate the flaps 26a,b defines the inlet opening or neck portion generally shown as 44.

As can be seen, the shape of the flattened air bag is generally rectangular, however, the top corner portion 46 of each of the panels 24a,b may extend slightly rearward. As will be seen from the description below, this portion 46 of the air bag is part of an upper chamber designed to provide protection for the occupant's head.

During the assembly of the air bag 20 the air bag 20 is divided into an upper, middle and lower chamber generally shown as 50, 52 and 54. Oval-shaped separating panels, such as 56a and 56b, are sewn to the side panels 24a and b. FIG. 6 shows the separating panels such as 56a and is also illustrative of the construction of panel 58a. The panel includes a plurality of narrow openings, vents or orifices 58 (and 58a) which control the flow of inflation gas from one chamber to another. In the embodiment shown, the flow openings 58 are circular and have a diameter of approximately 20 mm. As can be seen from FIGS. 1 and 5, the separator panels 56a and b extend from side 22 to side 40 of the air bag 20 such that the only passage between the various chambers is through the openings 58 (and 58a). As can be appreciated, the location and orientation of the separator panels 56a and 56b define the size and shape of upper, middle and lower chambers 50, 52 and 54 respectively. These separator panels can be installed such that when the air bag is inflated, these panels are essentially horizontal or at a predetermined angle. In the present invention the lower panel is generally horizontal and the upper panel is installed at an angle of about 22 degrees. By changing the angles the gas flow from the inflator can be modified and therefore change the direction of the kinematics of the deployment of the air bag. Further, the size of the flow openings 58 and 58a of the separator panels 56a and b can be different so as to retard or encourage flow between the chambers. By way of illustration a different sized opening is shown as 58a in separator panel 56b.

Reference is again made to FIG. 1. As can be seen, the lower edge 32 of the flaps 26a and b is initially collinear with the lower edge 30 of the cushion 22. As mentioned above, it is an object of the present invention to provide an air bag in which its lower or thorax portion (chamber 54) is consistently positioned adjacent the lower thorax of the occupant. This is accomplished by incorporating within the flaps 26a and b an integral tether 80 portion (see FIG. 5) and by modifying the adjacent portions of the flaps and the lower portion of chamber 54 in order to orient the lower edge 34 of the cushion 22 at an angle such as A relative to an imaginary axis 60 (see FIG. 2 which illustrates an exemplary mounting orientation of an inflator 100).

Figure 4:
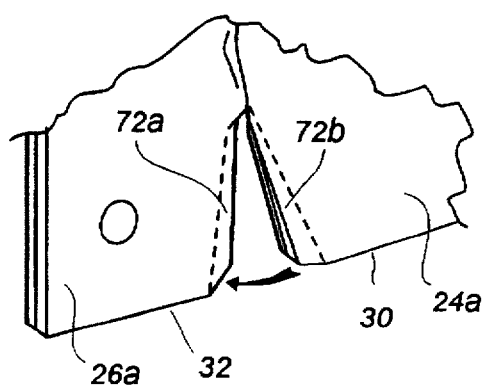
FIG. 4 is a partial view of the lower portion of the air bag with a V-shaped sector of material removed.

Reference is also made to FIG. 4 which shows a lower portion of the flaps 26a,b and panels 24a and 24b. As can be seen from FIG. 4 (and FIG. 1) a V-shaped portion of material generally shown as numeral 70 is removed from the cushion leaving adjacent angled flaps, slits or edges 72a (the flaps 26a,b) and flap 72b (in panels 24a,b). The height and width of this wedge-shaped portion can vary, however, we have found excellent results by removing a wedge-shaped piece of material having a height of approximately 75 mm (3 inches) and a width of approximately 38 mm (1.5 inches).

In the next stage of assembly, the flap or edge 72b is moved underneath flap or edge 72a. With the flaps or edges in this overlapping configuration, they are joined together by a series of stitches generally shown as 74 (see FIG. 5). As the flap or edge 72b of the panels 24a,b is moved beneath the edge 72a, the lower edge 34 of the air bag is reoriented at an angle A relative to the axis 60 (as shown in FIG. 2).

With reference to FIGS. 3 and 5, an integral tether 80 is formed in the lower portion of the flaps 26a,b. The lower portions of the flaps 28a,b, generally shown by numeral 82, are sewn together by a line of stitches 84 which extends across the flaps 26a,b and transitions downwardly to the lower edge 30 of the cushion 22. This tether includes an opening 86 (see FIGS. 4 and 5) to which a fastener 88 may be used to secure the tether 80 to a frame 90 of a vehicle seat. As can be appreciated, the upper portions 92 of the flaps 26a,b, by virtue of the stitches 84, are formed into a pocket 94 into which the inflator 100 is received. Inflators used in a side impact air bag module are generally known in the art and as such inflator 100 is shown somewhat diagrammatically. The inflator comprises a body in which a certain quantity of propellant and/or stored gas is located. The body includes a plurality of exit ports 102 located (in the present invention) at the lower extreme of the inflator. During installation the inflator is inserted within the pocket 94 and the upper portion 92 of the flaps 26a,b are wrapped about the studs 106a and 106b extending from the inflator such that openings 108 in the flaps 26a and b are received upon a respective one of the studs 106a,b. The inflator is thereafter secured to the frame 90 in a manner that would be dictated by the particular installation of the inflator 100 and air bag 20. Upon receipt of an electronic control signal indicative of a side collision event, the inflator 100 is energized producing or providing inflation gas through the exit ports 102. As can be appreciated because of the positioning of the exit ports 102 at the lower portion of the inflator, the inflation gasses enter into the inlet 44 of the thorax or lower chamber 54 just above the line of stitches 84. Arrow 110 is illustrative of the inflation gas flow into the lower or thorax chamber of the air bag. As the thorax portion 54 of the air bag inflates, the lower portion of the panels 24a and b react against the tether 80; the result of this is that the initial inflation trajectory of the air bag 20 is downward as illustrated by arrow 112. As the thorax portion of the air bag is inflated, the inflation gas will flow through the flow openings 58 into the middle chamber 52 of the air bag and then through the openings 58a into the upper chamber 50 of the air bag. In this manner, the lower chamber 54 is inflated first and the middle and upper sequentially inflated An inspection of accidents involving side impacts will show that the initial motion of the occupant caused by the side impact collision moves the side wall (and trim parts) of the vehicle toward the occupant. During the collision, the air bag 20 will be deployed to lie between the occupant and the side wall/trim. This interaction between the occupant, air bag 20 and vehicle side wall/trim compresses the lower chamber 54, increasing the pressure of the inflation gas therein and forcing the inflation gas into the middle chamber 52 to protect the upper torso and shoulder. As this interaction continues, the middle chamber is then compressed by the occupant's upper torso, the gas is forced to flow into the upper chamber 50 through openings 58a to protect the occupant's head.

Many changes and modifications in the above described embodiment of the invention can, of course, be carried out without departing from the scope thereof. Accordingly, that scope is intended to be limited only by the scope of the appended claims.

We claim:

1. An air bag (20) for protecting an occupant of a vehicle during a crash comprising:

a cushion portion (22) which when laid flat, prior to being inflated, is generally rectangularly shaped, a lower portion (54) of the cushion (22) includes an inlet opening (26) through which inflation gas is received to inflate the cushion, the inlet opening (26) being arranged generally parallel to a first axis, a lower edge (30) of the cushion initially extending generally perpendicularly from the first axis;

the air bag (20) further includes a neck portion (44) extending from the cushion generally about the inlet opening, the neck portion (44) including first means (42a,b) for mounting the air bag about an inflator (100) and an integral tether means (80), situated below the first means, for attaching the lower portion of the air bag to a nearby structure (90), for absorbing inflation forces as the air bag is inflated and for guiding the inflation trajectory of the air bag, a lower edge of the tether means (80) initially laying parallel to the lower edge of the cushion (22) and being an integral part of the lower portion of the cushion, the air bag further includes a slit (70) formed in the lower portion of the cushion initially separating the lower portion of the cushion from a lower portion of the neck portion, the slit defining first and second slitted segments (72a,b) in each of the neck portion and the cushion, one of the slitted segments positioned to overlay the other slitted segment and joined thereto, so that in this joined configuration the lower portion of the cushion is reoriented to lay generally at an angle below or above the first axis.

2. The air bag as defined in claim 1 wherein the lower portion of the air bag, subsequent to the joining of the slitted segments, extends below the lower edge of the tether means.

3. The air bag (20) as defined in claim 2 wherein the slitted segments are formed by cutting a triangular wedge from the neck portion and the lower portion of the cushion.

4. The air bag as defined in claim 3 wherein the neck portion (44) includes two extending flaps (26a,b) and wherein the tether means is formed by sewing a lower portion of the flaps together, such lower portion generally beginning below the top of the slitted segments and forming within the neck portion an upwardly extending pocket into which an inflator may be located.

5. The air bag as defined in claim 1 wherein the cushion is divided into a plurality of chambers, each chamber being separated by a flow restricting means to restrict the flow of inflation gas from a lower chamber to an upper chamber.

6. The air bag as defined in claim 5 wherein a separation panel (56a,b) joined to sides of the cushion separates each adjacent chamber (50, 52, 54).

7. The air bag as defined in claim 6 wherein the flow restricting means are located in each of the separation panels.

8. The air bag as defined in claim 6 wherein each separation panel is oval.

9. The air bag as defined in claim 5 wherein the air bag includes two or more chambers.

10. The air bag as defined in claim 1 wherein the first axis is generally parallel to a frame of a seat in which the air bag is installed.

11. An air bag for installation within a seat of a vehicle to protect an occupant during a side impact collision, the air bag being deployed between the occupant and an adjacent side of the vehicle, comprising:

a three chambered cushion portion (22), separation panels (56a,b) having inflation gas flow restricting openings (58.58a) therein to control the interchange of inflation gas between the chambers, the cushion, proximate a lower portion (54) of the chambers including a neck portion (44) forming a pocket (94) to receive an inflator and an inlet (44) through which inflation gas enters into the lower chamber and an integral tether means for assisting in controlling the deployment trajectory of the air bag.

12. The device as defined in claim 11 including an inflator (100) to provide inflation gas directly into the lower chamber.

13. The device as defined in claim 11 wherein the tether means is positioned below the pocket and is formed by overlapping a portion of the material proximate a lower edge of the neck portion and the lower chamber.

14. The device as defined in claim 13 wherein the flow restricting opening in the separating panel between a middle and upper chamber is larger than the opening in a separating panel between the lower and middle chambers.

* * * * *